United States Patent
Hung et al.

(10) Patent No.: US 7,995,970 B2
(45) Date of Patent: Aug. 9, 2011

(54) WIRELESS TRANSCEIVER

(75) Inventors: Liang-Hsien Hung, Taipei Hsien (TW); Mao-Chang Chuang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 262 days.

(21) Appl. No.: 12/426,282

(22) Filed: Apr. 20, 2009

(65) Prior Publication Data

US 2010/0240321 A1 Sep. 23, 2010

(30) Foreign Application Priority Data

Mar. 19, 2009 (CN) .......................... 2009 1 0300947

(51) Int. Cl.
*H04B 1/38* (2006.01)
(52) U.S. Cl. ........................................................ 455/73
(58) Field of Classification Search ................ 455/73
See application file for complete search history.

(56) References Cited

U.S. PATENT DOCUMENTS

| | | | | |
|---|---|---|---|---|
| 5,319,798 A * | 6/1994 | Watanabe | .................. | 455/76 |
| 6,047,178 A * | 4/2000 | Frlan | .................. | 455/423 |
| 6,118,984 A * | 9/2000 | Yu-Hong | .................. | 455/76 |
| 6,484,013 B1 * | 11/2002 | Ishii | .................. | 455/73 |
| 7,221,921 B2 * | 5/2007 | Maligeorgos et al. | .......... | 455/260 |
| 7,242,912 B2 * | 7/2007 | Maligeorgos et al. | .......... | 455/88 |
| 2004/0106380 A1 * | 6/2004 | Vassiliou et al. | .......... | 455/73 |
| 2005/0227629 A1 * | 10/2005 | Ali et al. | .......... | 455/73 |
| 2007/0054629 A1 * | 3/2007 | Maligeorgos et al. | .......... | 455/88 |

* cited by examiner

*Primary Examiner* — Lincoln Donovan
*Assistant Examiner* — William Hernandez
(74) *Attorney, Agent, or Firm* — Frank R. Niranjan

(57) ABSTRACT

A wireless transceiver includes an antenna, a filter, a radio frequency (RF) signal processing circuit, a shared amplifying circuit, a first switch circuit, a second switch circuit, a sending power amplifier, and a single-pole double-throw (SPDT) switch. The filter is connected between the antenna and the SPDT switch. The RF signal processing circuit outputs a first control signal when the antenna is utilized to send RF signals, and outputs a second control signal when the antenna is utilized to receive RF signals. The first switch circuit is connected between the shared amplifying circuit and the sending power amplifier, and switches on according to the first control signal. The second switch circuit is connected between the shared amplifying circuit and the SPDT switch, and switches on according to the second control signal. The SPDT switch selectively connects the filter to the sending power amplifier or the second switch circuit.

9 Claims, 4 Drawing Sheets

WIRELESS TRANSCEIVER

BACKGROUND

1. Technical Field

Embodiments of the present disclosure relate to wireless communication devices, and particularly to a wireless transceiver of a wireless communication device.

2. Description of Related Art

FIG. 4 is a block diagram of a wireless transceiver. A single-pole double-throw (SPDT) switch 60 connects a power amplifier 50 to a filter 70 when an antenna 80 is utilized to send radio frequency (RF) signals. In such a case, a RF signal processing circuit 10 initially sends the RF signals to a pre-amplifier 20, the pre-amplifier 20 pre-amplifies the sent RF signals, and then the power amplifier 50 further amplifies the pre-amplified RF signals. Further amplified RF signals are then transmitted to the filter 70 via the SPDT switch 60, where the filter 70 filters the further amplified RF signals. Finally, the antenna 80 sends the filtered RF signals out.

The SPDT switch 60 connects a low noise amplifier (LNA) 30 to the filter 70 when the antenna 80 is utilized to receive RF signals. In such a case, the antenna 80 receives the RF signals, and then the filter 70 filters the received RF signals. The filtered RF signals are then transmitted to the LNA 30 via the SPDT switch 60, where the LNA 30 amplifies the filtered RF signals. Finally, the RF signal processing circuit 10 receives the amplified RF signals.

In the above-mentioned wireless transceiver, the pre-amplifier 20 and the LNA 30 are two high frequency amplifiers. However, high frequency amplifiers include many components and usually have a large size, which leads to a high cost of the wireless transceiver.

BRIEF DESCRIPTION OF THE DRAWINGS

Many aspects of the embodiments can be better understood with references to the following drawings.

DETAILED DESCRIPTION

Figure 1:
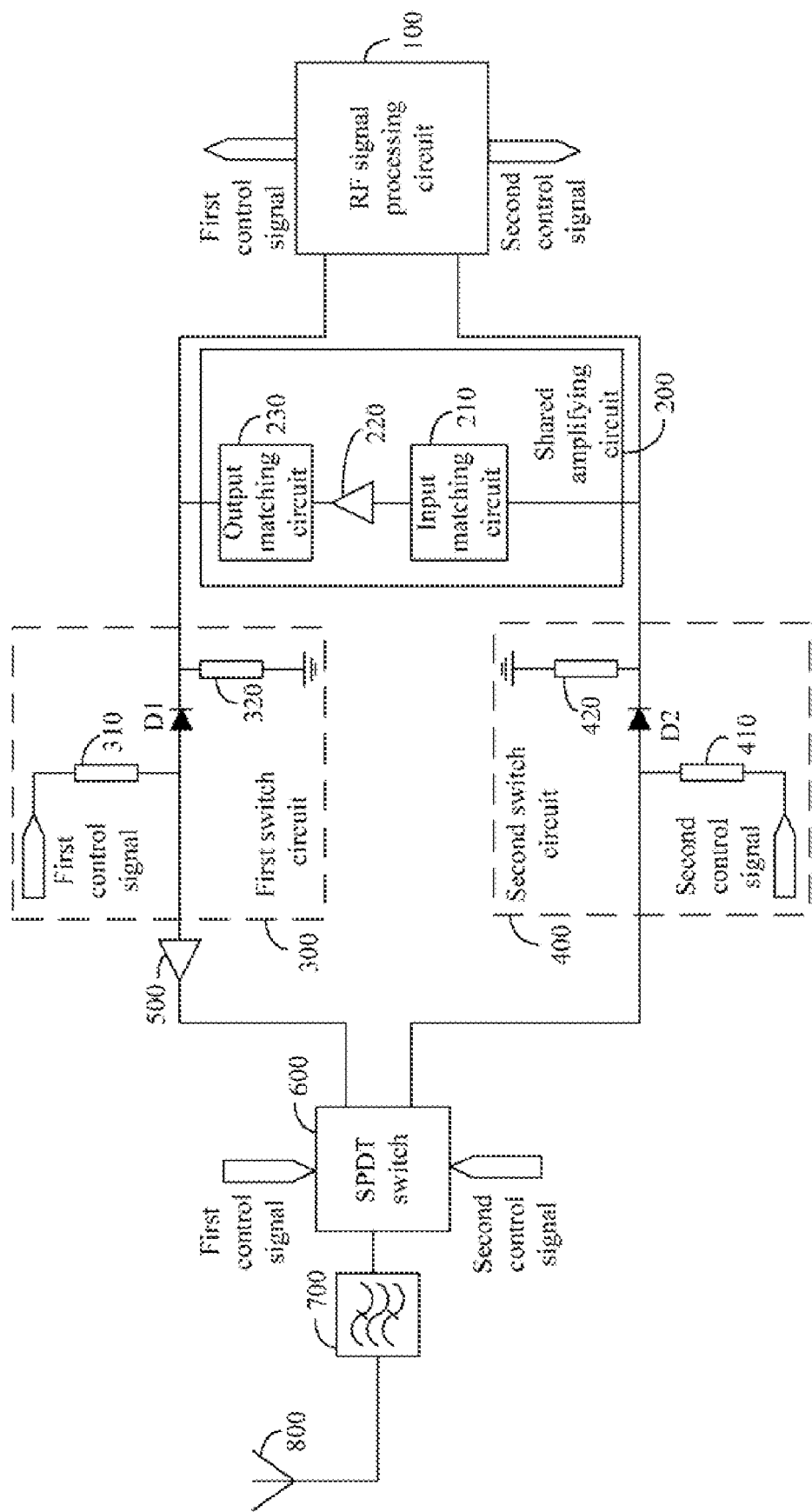
FIG. 1 is a block diagram of one embodiment of a wireless transceiver in accordance with the present disclosure.
Figure 2:
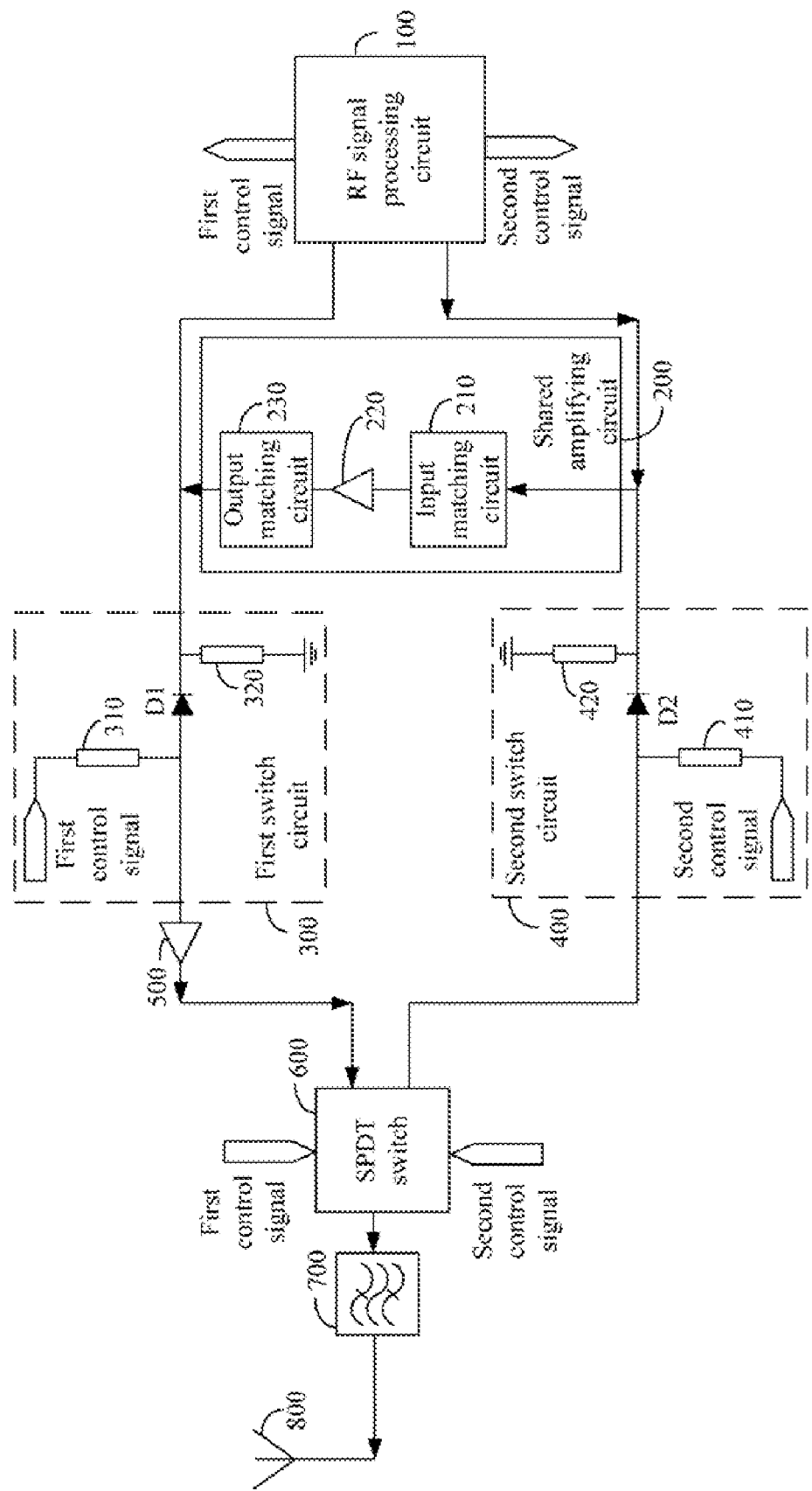
FIG. 2 is a schematic diagram of one embodiment of a wireless transceiver sending radio frequency (RF) signals in accordance with the present disclosure.

FIG. 1 is a block diagram of one embodiment of a wireless transceiver in accordance with the present disclosure. In one embodiment, the wireless transceiver can send and receive WIFI radio frequency (RF) signals, worldwide interoperability for microwave access (WIMAX) RF signals, or other RF signals. Accordingly, the wireless transceiver can be applied in a WIFI device, a WIMAX device, or another wireless communication device.

In one embodiment, the wireless transceiver includes a RF signal processing circuit 100, a shared amplifying circuit 200, a first switch circuit 300, a second switch circuit 400, a sending power amplifier 500, a single-pole double-throw (SPDT) switch 600, a filter 700, and an antenna 800. The antenna 800 sends and receives RF signals. The filter 700 is connected to the antenna 800 to filter the RF signals. The SPDT switch 600 includes a common terminal, a first terminal, and a second terminal.

The RF signal processing circuit 100 outputs a first control signal to the first switch circuit 300 and the SPDT switch 600 upon the condition that the antenna 800 is utilized to send the RF signals, and outputs a second control signal to the second switch circuit 400 and the SPDT switch 600 upon the condition that the antenna 800 is utilized to receive the RF signals. In one example, the antenna 800 may send and receive WIFI RF signals. In such a case, the RF signal processing circuit 100 determines when to send and receive the WIFI RF signals according to related RF signal sending and receiving regulations of the WIFI protocol. That is, the RF signal processing circuit 100 determines when to output the first control signal and when to output the second control signal according to the related RF signal sending and receiving regulations of the WIFI protocol.

In other examples, the wireless transceiver may send and receive other RF signals other than WIFI or WIMAX signals. Accordingly, the RF signal processing circuit 100 may determine when to send and receive the other RF signals according to other communication protocols.

An input end of the shared amplifying circuit 200 is connected to an output end of the RF signal processing circuit 100 and the second switch circuit 400. An output end of the shared amplifying circuit 200 is connected to an input end of the RF signal processing circuit 100 and the first switch circuit 300. The shared amplifying circuit 200 pre-amplifies RF signals from the RF signal processing circuit 100 upon the condition that the antenna 800 is utilized to send the RF signals, and amplifies RF signals from the second switch circuit 400 upon the condition that the antenna 800 is utilized to receive RF signals. In one embodiment, the shared amplifying circuit 200 includes an input matching circuit 210, a shared amplifier 220, and an output matching circuit 230.

The input matching circuit 210 is connected to the output end of the RF signal processing circuit 100 and the second switch circuit 400. The input matching circuit 210 adjusts an input impedance of the shared amplifying circuit 200. The output matching circuit 230 is connected to the input end of the RF signal processing circuit 100 and the first switch circuit 300. The output matching circuit 230 adjusts an output impedance of the shared amplifying circuit 200.

The shared amplifier 220 is connected between the input matching circuit 210 and the output matching circuit 230, to pre-amplify RF signals from the RF signal processing circuit 100 upon the condition that the antenna 800 is utilized to send the RF signals, and amplify the RF signals from the second switch circuit 400 upon the condition that the antenna 800 is utilized to receive the RF signals. In one embodiment, the shared amplifier 220 is a low noise amplifier (LNA).

The input matching circuit 210 and the output matching circuit 230 respectively adjust the input impedance and the output impedance of the shared amplifying circuit 200 so that the shared amplifier 220 have low noise output signals.

The first switch circuit 300 is connected between the output end of the shared amplifying circuit 200 and the sending power amplifier 500. The first switch circuit 300 switches on upon receiving the first control signal from the RF signal processing circuit 100. In one embodiment, the first switch circuit 300 includes a first transmission line 310, a first diode D1, and a second transmission line 320.

A first end of the first transmission line 310 is configured for receiving the first control signal from the RF signal processing circuit 100. An anode of the first diode D1 is connected to a second end of the first transmission line 310 and an input end of the sending power amplifier 500. A cathode of the first diode D1 is connected to the output of the shared amplifying circuit 200. The first diode D1 is turned on upon receiving the first control signal, and is turned off upon not receiving the first control signal. The second transmission line 320 is connected between the cathode of the first diode D1 and ground.

In one embodiment, the first transmission line 310 and the second transmission line 320 are about equal in length to one quarter wavelength of RF signals sent by the wireless transceiver. One transmission line with a length of one quarter wavelength can turn a short circuit into an open circuit. Therefore, the first control signal is grounded via the first transmission line 310 and the second transmission line 320 so as to turn on the first diode D1. For example, the first control signal may be a voltage signal of 3 volts (V), which is greater than a threshold voltage of the first diode D1, such as 0.7V RF signals sent by the wireless transceiver is blocked over the first transmission line 310 or the second transmission line 320.

The second switch circuit 400 is connected between the input end of the shared amplifying circuit 200 and the SPDT switch 600. The second switch circuit 400 switches on upon receiving the second control signal from the RF signal processing circuit 100. In one embodiment, the second switch circuit 400 includes a third transmission line 410, a second diode D2, and a fourth transmission line 420.

The third transmission line 410 has a first end configured for receiving the second control signal from the RF signal processing circuit 100. An anode of the second diode D2 is connected to a second end of the third transmission line 410 and the second terminal of the SPDT 600. A cathode of the second diode D2 is connected to the input end of the shared amplifying circuit 200. The second diode D2 is turned on upon receiving the second control signal, and is turned off upon not receiving the second control signal. The fourth transmission line 420 is connected between the cathode of the second diode D2 and the ground.

In one embodiment, the third transmission line 410 and the fourth transmission line 420 are about equal in length to one quarter wavelength of RF signals received by the wireless transceiver. Thus, the second control signal is grounded via the third transmission line 410 and the fourth transmission line 420 so as to turn on the second diode D2. For example, the second control signal can be a voltage signal of 3V, which is greater than a threshold voltage of the second diode D2, such as 0.7V RF signals received by the wireless transceiver is blocked over the third transmission line 410 or the fourth transmission line 420.

An input end of the sending power amplifier 500 is connected to the first switch circuit 300, and an output end of the sending power amplifier 500 is connected to the first terminal of the SPDT switch 600. The sending power amplifier 500 further amplifies the RF signals pre-amplified by the shared amplifying circuit 200 upon the condition that the first switch circuit 300 switches on. In one embodiment, the antenna 800 is utilized to send RF signals, so the first switch circuit 300 switches on. In such a case, the shared amplifying circuit 200 pre-amplifies RF signals received from the RF signal processing circuit 100 from low-level to line-level RF signals. The line-level RF signals is acceptable by the sending power amplifier 500. The sending power amplifier 500 further amplifies the line-level RF signals. The line-level RF signals that is acceptable by the sending power amplifier 500 is determined by performance parameters of the sending power amplifier 500, such as a power gain.

The common terminal of the SPDT switch 600 is connected to the filter 700, the first terminal of the SPDT switch 600 is connected to the output end of the sending power amplifier 500, and a second terminal of the SPDT switch 600 is connected to the second switch circuit 400. The SPDT switch 600 connects the common terminal to the first terminal according to the first control signal from the RF signal processing circuit 100, and connects the common terminal to the second terminal according to the second control signal from the RF signal processing circuit 100. In other words, the SPDT switch 600 connects the filter 700 to the sending power amplifier 500 according to the first control signal, and connects the filter 700 to the second switch circuit 400 according to the second control signal.

Figure 3:
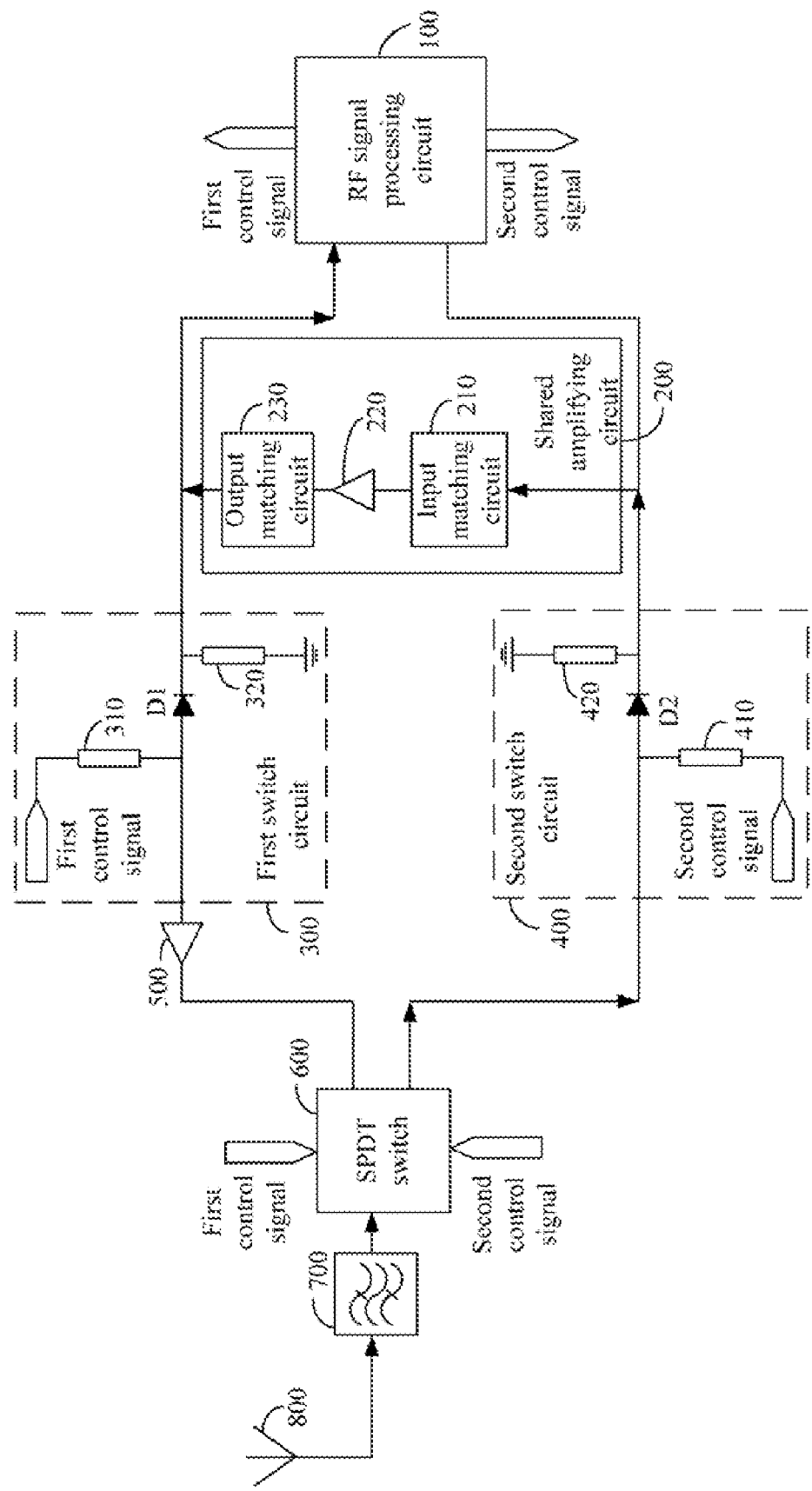
FIG. 3 is a schematic diagram of one embodiment of a wireless transceiver receiving RF signals in accordance with the present disclosure.

FIG. 3 is a schematic diagram of one embodiment of a wireless transceiver sending RF signals in accordance with the present disclosure. In this embodiment, the antenna 800 is utilized to send RF signals, so the RF signal processing circuit 100 sends a first control signal to the first switch circuit 300 so that the first switch circuit 300 switches on. Simultaneously, the RF signal processing circuit 100 sends the first control signal to the SPDT switch 600 so that the SPDT switch 600 connects the sending power amplifier 500 to the filter 700. The second switch circuit 400 switches off because it does not receive a second control signal from the RF signal processing circuit 100. In such a case, the RF signal processing circuit 100 initially sends RF signals to the shared amplifying circuit 200, and then the shared amplifying circuit 200 pre-amplifies the sent RF signals. Pre-amplified RF signals are then transmitted to the sending power amplifier 500 via the first switch circuit 300, where the sending power amplifier 500 further amplifies the pre-amplified RF signals. Further amplified RF signals are then transmitted to the filter 700 via the SPDT switch 600, where the filter 700 filters the further amplified RF signals. Finally, the antenna 800 sends the filtered RF signals out.

Figure 4:
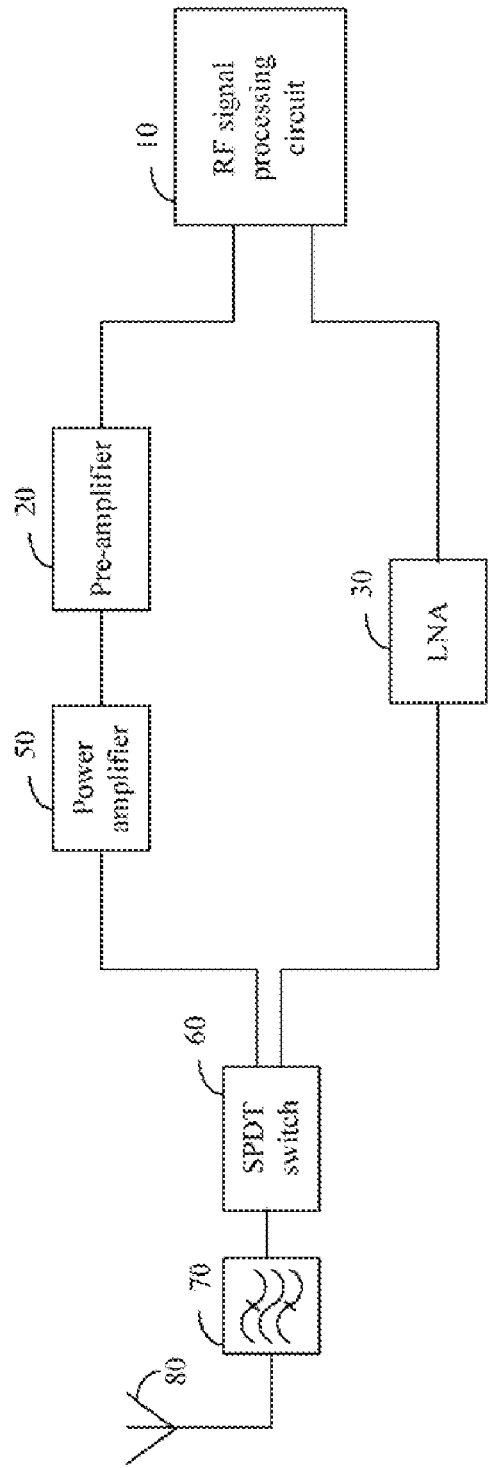
FIG. 4 is a block diagram of a wireless transceiver.

FIG. 4 is a schematic diagram of one embodiment of a wireless transceiver receiving RF signals in accordance with the present disclosure. In this embodiment, the antenna 800 is utilized to receive RF signals, so the RF signal processing circuit 100 sends a second control signal to the second switch circuit 400 so that the second switch circuit 400 switches on. Simultaneously, the RF signal processing circuit 100 sends the second control signal to the SPDT switch 600 so that the SPDT switch 600 connects the filter 700 to the second switch circuit 400. The first switch circuit 300 switches off because it does not receive a first control signal from the RF signal processing circuit 100. In such a case, the antenna 800 initially receives the RF signals, and the filter 700 filters the received RF signals. The filtered RF signals are then transmitted to the shared amplifying circuit 200 via the SPDT switch 600 and the second switch circuit 400, where the shared amplifying circuit 200 amplifies the filtered RF signals. Finally, the RF signal processing circuit 100 receives the amplified RF signals.

Thus, the shared amplifying circuit 200 acts as a pre-amplifier when the wireless transceiver sends RF signals, and acts as a LNA when the wireless transceiver receives RF signals. Therefore, a high frequency amplifier is reduced, and accordingly the wireless transceiver has a smaller size and a lower cost. In addition, the first switch circuit 300 and the second switch circuit 400 utilize the transmission lines (such as the first transmission line 310, the second transmission line 320, the third transmission line 410, and the fourth transmission line 420) having lengths of one quarter wavelength of RF signals to block the RF signals, thereby simplifying circuit designs of the wireless transceiver.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A wireless transceiver for sending and receiving radio frequency (RF) signals, comprising:
   an antenna that sends and receives the RF signals;
   a filter connected to the antenna to filter the RF signals;
   a RF signal processing circuit that outputs a first control signal upon the condition that the antenna is utilized to send the RF signals, and outputs a second control signal upon the condition that the antenna is utilized to receive the RF signals;
   a shared amplifying circuit comprising an input end connected to an output end of the RF signal processing circuit and an output end connected to an input end of the RF signal processing circuit, the shared amplifying circuit operable to pre-amplify the RF signals upon the condition that the antenna is utilized to send the RF signals, and amplify the RF signals upon the condition that the antenna is utilized to receive the RF signals;
   a first switch circuit connected to the output end of the shared amplifying circuit, wherein the first switch circuit switches on upon receiving the first control signal from the RF signal processing circuit;
   a second switch circuit connected to the input end of the shared amplifying circuit, wherein the second switch circuit switches on upon receiving the second control signal from the RF signal processing circuit;
   a sending power amplifier with an input end connected to the first switch circuit, the sending power amplifier operable to further amplify the RF signals pre-amplified by the shared amplifying circuit upon the condition that the first switch circuit switches on; and
   a single-pole double-throw (SPDT) switch with a common terminal connected to the filter, a first terminal connected to an output end of the sending power amplifier, and a second terminal connected to the second switch circuit, the SPDT switch connecting the common terminal to the first terminal according to the first control signal from the RF signal processing circuit, and connecting the common terminal to the second terminal according to the second control signal from the RF signal processing circuit.

2. The wireless transceiver as claimed in claim 1, wherein the shared amplifying circuit comprises:
   an input matching circuit connected to the output end of the RF signal processing circuit, to adjust an input impedance of the shared amplifying circuit;
   an output matching circuit connected to the input end of the RF signal processing circuit, to adjust an output impedance of the shared amplifying circuit; and
   a shared amplifier connected between the input matching circuit and the output matching circuit, to pre-amplify RF signals from the RF signal processing circuit upon the condition that the antenna is utilized to send the RF signals, and amplify RF signals from the second switch circuit upon the condition that the antenna is utilized to receive the RF signals.

3. The wireless transceiver as claimed in claim 2, wherein the shared amplifier is a low noise amplifier.

4. The wireless transceiver as claimed in claim 1, wherein the first switch circuit comprises:
   a first transmission line with a first end configured for receiving the first control signal from the RF signal processing circuit;
   a first diode with an anode connected to a second end of the first transmission line and the input end of the sending power amplifier, and a cathode connected to the output end of the shared amplifying circuit, the first diode being turned on upon receiving the first control signal, and being turned off upon not receiving the first control signal; and
   a second transmission line connected between the cathode of the first diode and ground.

5. The wireless transceiver as claimed in claim 4, wherein the first transmission line and the second transmission line are substantially equal in length to one quarter wavelength of the RF signals sent by the wireless transceiver.

6. The wireless transceiver as claimed in claim 5, wherein:
   the first control signal is grounded via the first transmission line and the second transmission line so as to turn on the first diode, and the RF signals sent by the wireless transceiver is blocked over the first transmission line or the second transmission line.

7. The wireless transceiver as claimed in claim 1, wherein the second switch circuit comprises:
   a third transmission line with a first end configured for receiving the second control signal from the RF signal processing circuit;
   a second diode with an anode connected to a second end of the third transmission line and the second terminal of the SPDT switch, and a cathode connected to the input end of the shared amplifying circuit, the second diode being turned on upon receiving the second control signal, and being turned off upon not receiving the second control signal; and
   a fourth transmission line connected between the cathode of the second diode and ground.

8. The wireless transceiver as claimed in claim 7, wherein the third transmission line and the fourth transmission line are substantially equal in length to one quarter wavelength of the RF signals received by the wireless transceiver.

9. The wireless transceiver as claimed in claim 8, wherein:
   the second control signal is grounded via the third transmission line and the fourth transmission line so as to turn on the second diode, and the RF signals received by the wireless transceiver is blocked over the third transmission line or the fourth transmission line.

* * * * *